(12) United States Patent
Shah et al.

(10) Patent No.: US 8,997,194 B2
(45) Date of Patent: *Mar. 31, 2015

(54) USING WINDOWS AUTHENTICATION IN A WORKGROUP TO MANAGE APPLICATION USERS

(71) Applicant: Microsoft Corporation, Redmond, WA (US)

(72) Inventors: Mehul Y. Shah, Redmond, WA (US); Benoit Sanscartier, Issaquah, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/935,205

(22) Filed: Jul. 3, 2013

(65) Prior Publication Data

US 2013/0298212 A1 Nov. 7, 2013

Related U.S. Application Data

(63) Continuation of application No. 12/138,302, filed on Jun. 12, 2008, now Pat. No. 8,533,797.

(51) Int. Cl.
*G06F 17/30* (2006.01)
*H04L 29/06* (2006.01)
(Continued)

(52) U.S. Cl.
CPC ............. *H04L 63/08* (2013.01); *G06F 21/335* (2013.01); *H04L 9/3234* (2013.01)
USPC .......... 726/7; 726/28; 726/8; 726/9

(58) Field of Classification Search
USPC .................................................. 726/7–9, 28
See application file for complete search history.

(56) References Cited

U.S. PATENT DOCUMENTS

| 5,832,511 A | 11/1998 | Beck et al. |
| 6,092,199 A | 7/2000 | Dutcher et al. |
| 6,915,451 B2 | 7/2005 | Fitzgerald et al. |

(Continued)

OTHER PUBLICATIONS

"Mac OS X Server Technologies File Services," © 2002 Apple Computer, 6 pages, http://images.apple.com/ca/fr/server/pdf/L21949A_FileSrvs_TB.pdf [last accessed Nov. 6, 2008].

(Continued)

*Primary Examiner* — Amare F Tabor
(74) *Attorney, Agent, or Firm* — Damon Rieth; Sade Fashokun; Micky Minhas

(57) ABSTRACT

An system for authenticating users of an application program executing at a front-end computer using the security features built into the operating system of a logon computer is provided. Initially, an administrator establishes user accounts for each user with an operating system executing at the logon computer with access to application resources. When the application program starts executing at the front-end computer, the application program prompts the user for credentials. The application program attempts to access resources managed by the logon computer using the received credentials. When access to a resource is successful, the application program knows that the logon computer has authenticated the user and the user is authorized to access the resource. In this manner, the application program can take advantage of the security features built into the operating system executing at the logon computer to authenticate users of the application program and authorize access to application resources.

20 Claims, 9 Drawing Sheets

(51) Int. Cl.
*G06F 21/33* (2013.01)
*H04L 9/32* (2006.01)

(56) References Cited

U.S. PATENT DOCUMENTS

| | | | |
|---|---|---|---|
| 6,954,790 B2 | 10/2005 | Forslow et al. | |
| 7,072,807 B2 | 7/2006 | Brown et al. | |
| 7,155,518 B2 | 12/2006 | Forslow et al. | |
| 7,451,484 B1 | 11/2008 | Nadalin et al. | |
| 7,512,651 B2* | 3/2009 | Offermann | 709/203 |
| 7,562,226 B2 | 7/2009 | Aiken et al. | |
| 7,577,987 B2* | 8/2009 | Mizrah | 726/5 |
| 7,587,499 B1* | 9/2009 | Haghpassand | 709/229 |
| 7,895,645 B2 | 2/2011 | Bodepudi et al. | |
| 7,925,712 B2 | 4/2011 | Bowers et al. | |
| 8,533,797 B2 | 9/2013 | Shah et al. | |
| 8,639,824 B1* | 1/2014 | Basu et al. | 709/229 |
| 2002/0031230 A1 | 3/2002 | Sweet et al. | |
| 2006/0183462 A1* | 8/2006 | Kolehmainen | 455/411 |
| 2007/0016630 A1 | 1/2007 | Samji et al. | |
| 2009/0222878 A1 | 9/2009 | Walsh et al. | |
| 2009/0313684 A1 | 12/2009 | Shah et al. | |

OTHER PUBLICATIONS

"Visual Studio Team System User Education-Team Foundation Server Security Concepts," 7 pages, http://blogs.msdn.com/vstsue/articles/503212.aspx [last accessed Nov. 6, 2008].

"Windows NT Network Security A Manager's Guide," Department of Energy CIAC, Dec. 1997, 31 pages, http://www.ciac.org/ciac/documents/CIAC-2317_Windows_NT_Managers_Guide.pdf [last accessed Nov. 6, 2008].

"Sun RayTM Enterprise Appliance Hot Desk architecture," Copyright 1994-1999 Sun Microsystems, Inc., 4 pages, http://cn.sun.com/webtop/hotdesk.pdf [last accessed Nov. 6, 2008].

* cited by examiner

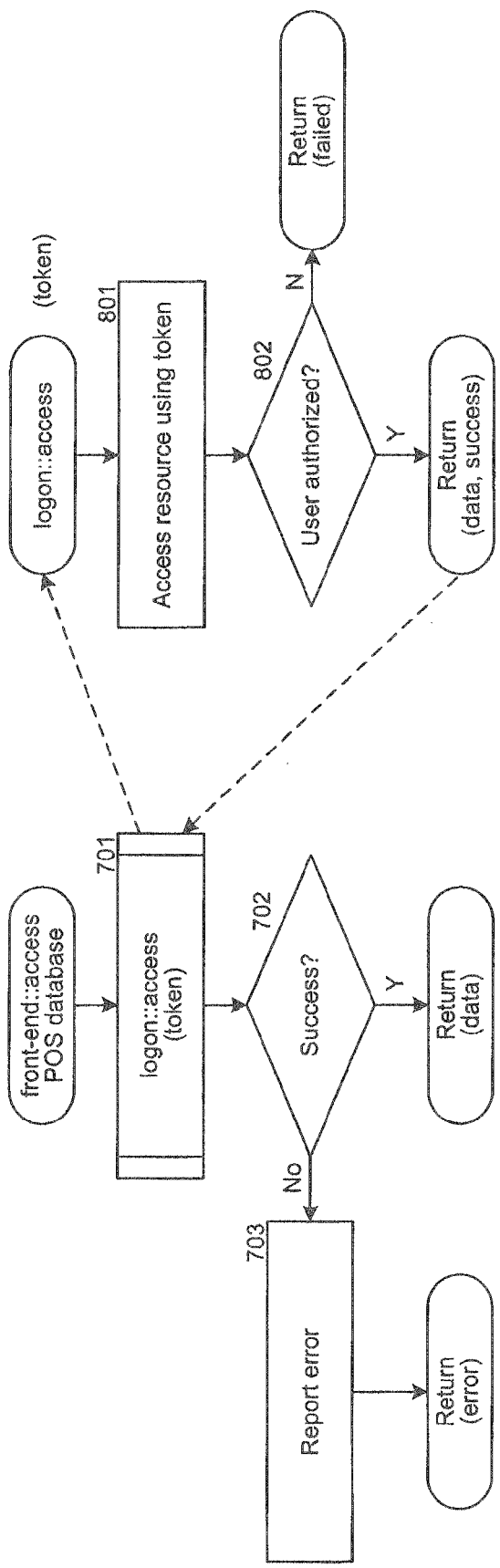

USING WINDOWS AUTHENTICATION IN A WORKGROUP TO MANAGE APPLICATION USERS

CROSS REFERENCE TO RELATED APPLICATION

This application is a continuation application of U.S. patent application Ser. No. 12/138,302, filed on Jun. 12, 2008, now U.S. Pat. No. 8,533,797, and entitled "USING WINDOWS AUTHENTICATION IN A WORKGROUP TO MANAGE APPLICATION USERS," which is incorporated herein in its entirety by reference.

BACKGROUND

Many organizations, such as companies and nonprofit organizations, use application programs to manage various resources, such as financial records, inventories, transaction histories, and other databases. These application programs include point of sale programs, accounting programs, customer relation management programs, enterprise resource management programs, security programs and so on. Some application programs may be multi-user programs installed on each of several front-end computers connected via a communications link, each front-end computer providing a user with access to the application program. For example, a retail store may provide front-end computers at each of several checkout lanes where a cashier can access the application program and conduct various transactions. A user may first logon to a front-end computer using a pre-established account on the front-end computer and then execute the application program. Alternatively, the front-end computer may already be logged into an account, such as a guest account, or may allow any user to execute the application program without logging on. Application programs may manage, or have access to, privileged or confidential information or resources (e.g., customer data, credit card information, transaction records, or secured premises) and require varying levels of access to these resources. For example, a retail cashier may be able to view customer data and perform sales transactions while a retail manager may be able to edit customer data and void transactions in addition to being able to perform all of the actions a cashier can perform.

Some application programs authenticate and authorize access to resources using proprietary or third-party security mechanisms built into the application program. For example, a point of sale application program may store credentials and user account information at a primary computer and prompt users to provide credentials to logon to their account each time they require access to the application program. When the user provides credentials, the application program may transmit the credentials to an instance of the application program at the primary computer to authenticate the user and authorize requests from users to access data. Alternatively, credentials and account information may be distributed to front-end computers periodically so that the application program can authenticate and authorize requests from users to access data without accessing a primary computer. However, distributing credentials and account information can create latency issues. For example, a computer may not be available when the information is distributed and new users or users whose account and credential information has changed may be unable to connect to the application program until the next distribution.

Requiring application program providers to integrate security features into their application programs and maintain these features can be time consuming, expensive, and duplicative for the providers as each application program provider may need to implement their own security mechanisms or incorporate third-party security modules. Further complicating this problem is the requirement that the security features of these application programs comply with various industry standards, such as the Payment Card Industry (PCI) Data Security Standard and Payment Application Best Practices (PABP), set forth by various standards-setting bodies, such as the PCI Security Standards Council and Visa Inc. Application program providers must continually update their application programs to meet these changing standards or face security risks, loss of customer confidence, and loss of accreditation.

SUMMARY

An authentication system for authenticating the user of an application program executing at a front-end computer using security features built into the operating system of a logon computer is provided. Initially, an administrator establishes user accounts for each user with an operating system executing at the logon computer. The administrator grants each user, via the user account, access to a resource, access to which is managed by the operating system executing at the logon computer. Access to protected resources and data used by the application may be managed by the operating system executing at the logon computer, by an intermediary computer or by other mechanisms. When the application program starts executing at the front-end computer, the application program needs to authenticate the user and check whether that user is authorized to access those resources. To authenticate the user, the application program prompts the user to enter their credentials. When the application program receives the credentials, the application program attempts to access the resource managed by the logon computer by sending a request to access the resource and the received credentials to the logon computer, which stores account information and access rights for each user account. Using the pre-established user accounts, the operating system executing at the logon computer can determine whether a user has provided valid credentials and whether the user account associated with those credentials has permission to access the resource. An indication of whether the attempt was successful is then returned to the front-end computer. The front-end computer may then provide an indication to the user that the attempt was successful and that the user is authenticated. If the attempt was unsuccessful, the application program may prompt the user to re-enter credentials. In this manner, the application program can take advantage of the security functionality built into the operating system executing at the logon computer to authenticate users of the application program.

This Summary is provided to introduce a selection of concepts in a simplified form that are further described in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 7 is a flow diagram illustrating the processing of the access POS database component of a front-end computer in some embodiments.

FIG. 8 is a flow diagram illustrating the processing of the access component of a logon computer in some embodiments.

DETAILED DESCRIPTION

Figure 1:
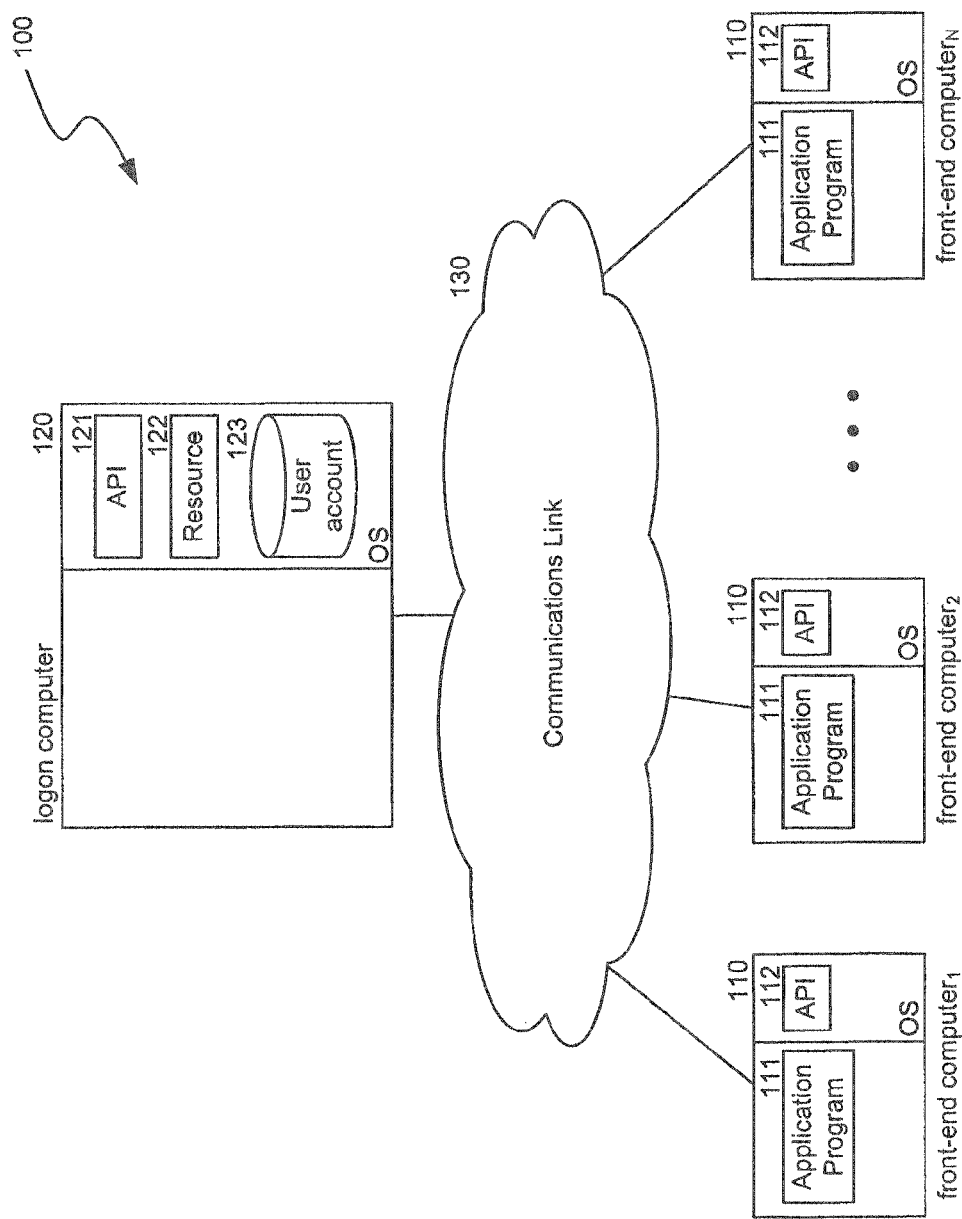
FIG. 1 is a block diagram illustrating various components of the authentication system used to authenticate a user of an application program executing at a front-end computer in some embodiments.

An authentication system for authenticating the user of an application program executing at a front-end computer using security features built into the operating system of a logon computer is provided. Initially, user accounts are established for each user with an operating system executing at the logon computer. For example, an administrator, or a user with administrative privileges, may connect to the logon computer and establish accounts for two users, Joe and Sally. Each account specifies credentials for authenticating a specific user, such as a username, password, date of birth, social security number, biometric data, etc. The administrator may grant each user, via the user account, access to a resource, access to which is managed by the operating system executing at the logon computer. For example, the administrator may grant Joe and Sally access to a file or a database located on the logon computer. These permissions may be stored in association with the user accounts, the resources, or both. Furthermore, the administrator may associate each user account with a group with a set of privileges that may be attributed to any user account associated with the group. These groups may correspond to user roles established by the application program. For example, the administrator may associate Joe with a "cashier" group and associate Sally with a "manager" group. The "cashier" group may have read access to a database located on the logon computer, and the "manager" group may have read and write access to the database.

When a user accesses a front-end computer, the user may need to log on to the operating system executing at the front-end computer before executing the application program. Once executed, the application program needs to check the credentials of the user. The logon accounts at each front-end computer may be inefficient for authenticating a user because they require that each front-end computer contain complete account information for each user, which can create latency problems and duplicative account information stored at several front-end computers. To authenticate the user, the application program prompts the user to enter their credentials by, for example, displaying a dialog box providing a location for a user to enter a username and password or any other data the application program may require to authenticate the user. When the user supplies the credentials to the application program, the application program attempts to access the resource managed by the logon computer by sending a request to access the resource and the received credentials to the logon computer, which stores account information and access rights for each user account. Because the operating system executing at the logon computer manages access to the resource, the authentication system can take advantage of the security features built into the operating system to authenticate the user. Using the pre-established user accounts, the operating system executing at the logon computer can determine whether a user has provided valid credentials and whether the user account associated with those credentials has permission to access the resource. The operating system executing at the logon computer then transmits to the front-end computer an indication of whether the attempt was successful. The front-end computer may then provide an indication to the user that the attempt was successful and the user is authenticated, such as displaying a welcome message or transitioning to another user interface screen of the application program. If the attempt was not successful, the user may be prompted to re-enter credentials. In this manner, the application program can take advantage of the security functionality built into the operating system executing at the logon computer to authenticate the user of an application program without requiring complete account information to be transferred to or stored at each front-end computer.

In some embodiments, the operating system of the logon computer may use tokens to authenticate users. Tokens provide information about a user account, such as a user identifier, groups with which the user account is associated, and access rights and privileges associated with the user account. Operating systems generate tokens based on user credentials and use the tokens to authenticate users and authorize user requests to access resources. When credentials are presented to an operating system, some operating systems generate a token and return the token along with an indication of whether the credentials are valid (i.e., the user is authenticated). Some operating systems, however, generate tokens without indicating whether the credentials are valid. If a user provides incorrect credentials, the operating system generates a token having no access to resources managed by the operating system. If the operating system does not indicate whether the credentials are valid, the authentication system will not know whether the user has been authenticated by the operating system. In these environments, additional steps are required to authenticate a user. For example, an application may determine whether the token is valid and thus authenticate the user by requesting access to a resource managed by the operating system using the token generated with credentials received from the user. If the requested access is successful, the application considers the token valid and authenticates the user.

In some embodiments, the authentication system may take advantage of the built-in security features of the operating system executing at the logon computer to authenticate users of an application program and to authorize requests made by those users to access a resource. As described above, user accounts are established for each of a plurality of users with an operating system executing at the logon computer and access to a resource managed by the operating system is granted to each user. For example, each user may be granted permission to open a connection to a database. Upon executing the application program, the user is prompted to enter credentials; these credentials are then passed to the operating system executing at the logon computer (e.g., via a remote logon request of the MICROSOFT WINDOWS operating system), which generates a token using the received credentials. Because the token generation process may not indicate whether the credentials are valid, the application program cannot confirm authentication upon receipt of the token. To determine whether the token is valid and thus authenticate the user, the application program may attempt to use the token to access a resource managed by the operating system executing at the logon computer. For example, the application program may automatically attempt to open a connection to a database managed by the logon computer using the token. Because the operating system executing at the logon computer manages access to the database, the authentication and authorization features built into the operating system are used to process the request to open a connection to the database. If the operating system executing at the logon computer denies access to open a connection to the database, then the application program assumes the credentials were invalid or that the account with those credentials was not authorized to connect to the database and prompts the user to re-enter the credentials. If a connection is opened, the user is assumed to be authenticated and authorized to connect to the database and the token stored at the front-end computer so that requests by the user to access the database can be made using the token. When the user requests access to the database (e.g., to read data), the application program forwards a request with the token to the logon computer. The operating system executing at the logon computer determines whether the user has permission to access the database in the manner requested and if so, the database is accessed. In this manner, the authentication system uses the operating system executing at the logon computer to authenticate users of the application program and to authorize access requests made by those users.

In some embodiments, the authentication system may use the built-in security features of the operating system executing at the logon computer to authenticate an application program user at a front-end computer attempting to access a resource located at an intermediary computer. In this example, the intermediary computer uses the token model to authenticate users requesting access to a database stored at the intermediary computer. As described above, user accounts are first established with the logon computer. Each user account specifies access rights to at least one resource managed by the logon computer. Furthermore, an access control list is created and stored at the intermediary computer by, for example, an administrator. The access control list provides an indication of each user's access rights to the database. When a user executes the application program, the application program prompts the user to enter credentials. The application program passes these credentials to the intermediary computer which requests a token from the logon computer using the credentials (e.g., via a remote logon request). After receiving the token, the intermediary computer requests access to the resource of the logon computer using the token. Because the operating system executing at the logon computer manages access to the resource, the security features of the operating system are employed to authorize the request access and, therefore, validate the token and authenticate the user. An indication of whether the operating system executing at the logon computer authorizes the requested access is then returned to the intermediary computer, which forwards it to the front-end computer. If the access request was not successful, the user may be prompted to re-enter credentials. If the access request was successful, the user is authenticated and the front-end computer stores the token so that requests to access the database can be made using the token. In some embodiments, the token is also stored at the intermediary computer. When the token is stored at the intermediary computer and a user requests access to the database using a token, the user is authenticated at the intermediary computer by comparing the stored token with the received token. If the tokens are identical, the user is authenticated. If, however, the token is not stored at the intermediary computer and a user requests access to the database using a token, the token is passed to the logon computer where the validity of the token and the authenticity of the user can be determined by attempting to access the resource at the logon computer using the token. Once the user is authenticated, the access control list is used to determine whether the user is authorized to access the database in the manner requested. In this manner, the security features of the operating system executing at the logon computer are used to authenticate users at front-end computers attempting to access a resource at an intermediary computer.

FIG. 1 is a block diagram illustrating various components of the authentication system used to authenticate a user of an application program executing at a front-end computer in some embodiments. An instance of the application program 111 is stored at each of several front-end computers 110. The application program provides a user interface and logic for interacting with other components of the authentication system. Each front-end computer also includes Application Programming Interface ("API") 112 for interacting with the operating system executing at each front-end computer. Logon computer 120 includes API 121 for interacting with the operating system executing at the logon computer, resource 122, and user account store 123. Resource 122 may be any resource to which the operating system executing at the logon computer may manage access. For example, the resource may be a file, a database, a peripheral device, etc. User account store 123 stores information about each user who has established an account with the operating system executing at the logon computer (e.g., user credentials), access rights to various resources (e.g., resource 122), rights to execute privileged operations, groups with which each user is associated, and so on. Logon computer 120 and front-end computers 110 may be connected via communications link 130.

The computing devices on which the authentication system is implemented may include a central processing unit, memory, input devices (e.g., keyboard and pointing devices), output devices (e.g., display devices), and storage devices (e.g., disk drives). The memory and storage devices are computer-readable media that may be encoded with computer-executable instructions that implement the authentication system, which means a computer-readable medium that contains the instructions. In addition, the instructions, data structures, and message structures may be stored or transmitted via a data transmission medium, such as a signal on a communications link and may be encrypted. Various communications links may be used, such as the Internet, a local area network, a wide area network, a point-to-point dial-up connection, a cell phone network, and so on.

Embodiments of the authentication system may be implemented in and used with various operating environments that include personal computers, server computers, handheld or laptop devices, multiprocessor systems, microprocessor-based systems, programmable consumer electronics, digital cameras, network PCs, minicomputers, mainframe computers, computing environments that include any of the above systems or devices, and so on.

The authentication system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Figure 2:
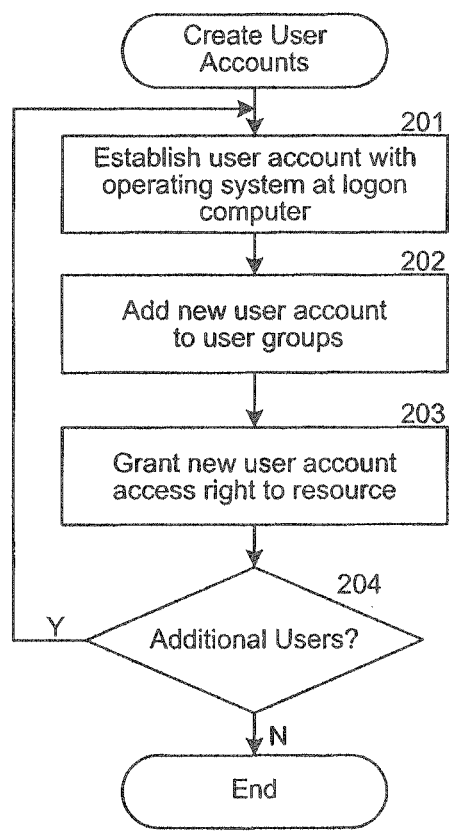
FIG. 2 is a flow diagram that illustrates the process of creating user accounts in some embodiments.

FIG. 2 is a flow diagram that illustrates the process of creating user accounts in some embodiments. In block 201, an administrator establishes a user account with the operating system executing at the logon computer. Establishing a user account may include the steps of providing user credentials, such as a username and password, which the user provides during the authentication process. This information may be in the form of alphanumeric characters, images, biometric data (e.g., facial data, voice data, fingerprint data, etc.), data contained in a bar code, data stored in an radio-frequency identification (RFID) tag, or any other means of uniquely identifying an individual. In block 202, the administrator associates the user account with appropriate pre-established user groups with access rights to various resources. For example, an "Administrator" group may have read and write access to all resources located at the logon computer while a "User" group may only have read access to some resources and no access to others. A user account may inherit some or all of the access rights and privileges associated with a group when the user account is associated with the group. In block 203, the administrator grants the user account access rights to a resource managed by the operating system executing at the logon computer. These are specific rights for the user that are not associated with a particular user group. For example, an administrator may grant a user account rights to read a file located on the logon computer or open a connection to a database. These access rights can be used in the processes of authenticating and authorizing users attempting to access resources. When an application program attempts to access these resources, the access request is handled by the operating system, allowing the application program to leverage the security features built into the operating system to authenticate users and authorize user access requests. In some embodiments, a user's permissions may be established exclusively by associating the user with user group or, alternatively, by assigning specific rights to a user. In decision block 204 if there are no additional user accounts to be created, then the process completes, otherwise the process loops to block 201 so that another user account can be created.

Figures 3, 4:
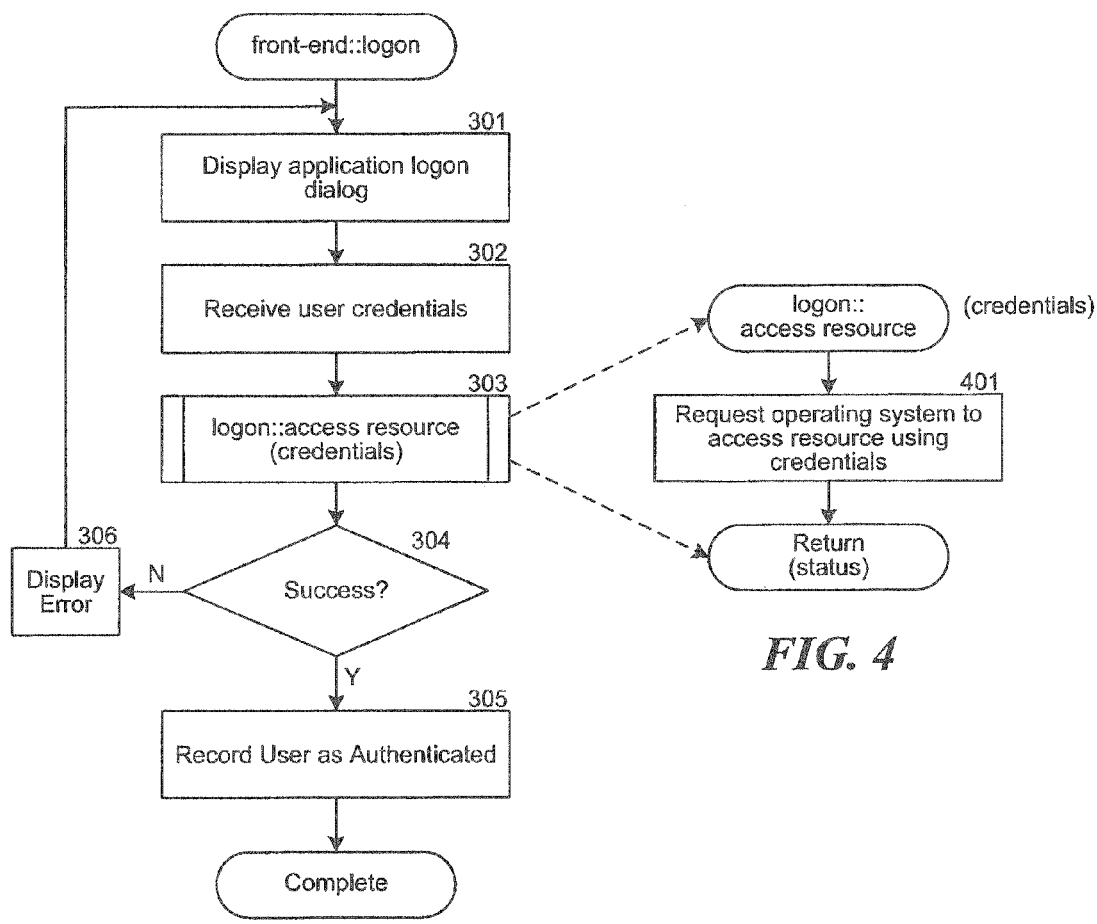
FIG. 3 is a flow diagram that illustrates the processing of the logon component of an application program of a front-end computer in some embodiments.
FIG. 4 is a flow diagram that illustrates the processing of the access resource component of a logon computer in some embodiments.

FIG. 3 is a flow diagram that illustrates the processing of the logon component of an application program of a front-end computer in some embodiments. The component attempts to authenticate the user at the front-end computer based on credentials provided by the user. In block 301, the component displays a logon dialog prompting the user to enter the user's credentials. For example, the dialog may prompt the user to enter a username and password or to provide other types of data such as biometric data or data stored in an RFID tag. In block 302, the component receives the credentials from the user. In block 303, the component attempts to access a resource of the logon computer by invoking an access resource component of the logon computer using the received credentials. In decision block 304, if the access was successful, then in block 305, the component records the user as authenticated. If the access was not successful, then in block 306, the component displays an error message and loops to block 301 so that the user can re-enter credentials.

FIG. 4 is a flow diagram that illustrates the processing of the access resource component of a logon computer in some embodiments. The component determines whether a user account associated with a set of received credentials is authorized to access a particular resource and returns an indication of whether the access is authorized. In block 401, the component requests access to a resource managed by the operating system using the credentials. For example, the operating system executing at the logon computer may use the credentials to attempt to access the resource on the user's behalf. Because access to the resource is managed by the operating system executing at the logon computer, the user authentication features of the operating system are used to determine whether the user has permission to access the resource. If the user's account has the right to access the resource in the manner requested, then the resource is accessed, else access is denied. Alternatively, the operating system may simply determine whether the user account has access rights to the resource by, for example, looking up access rights in a table. The component then returns an indication of whether the resource was accessed using the received credentials.

Figure 5:
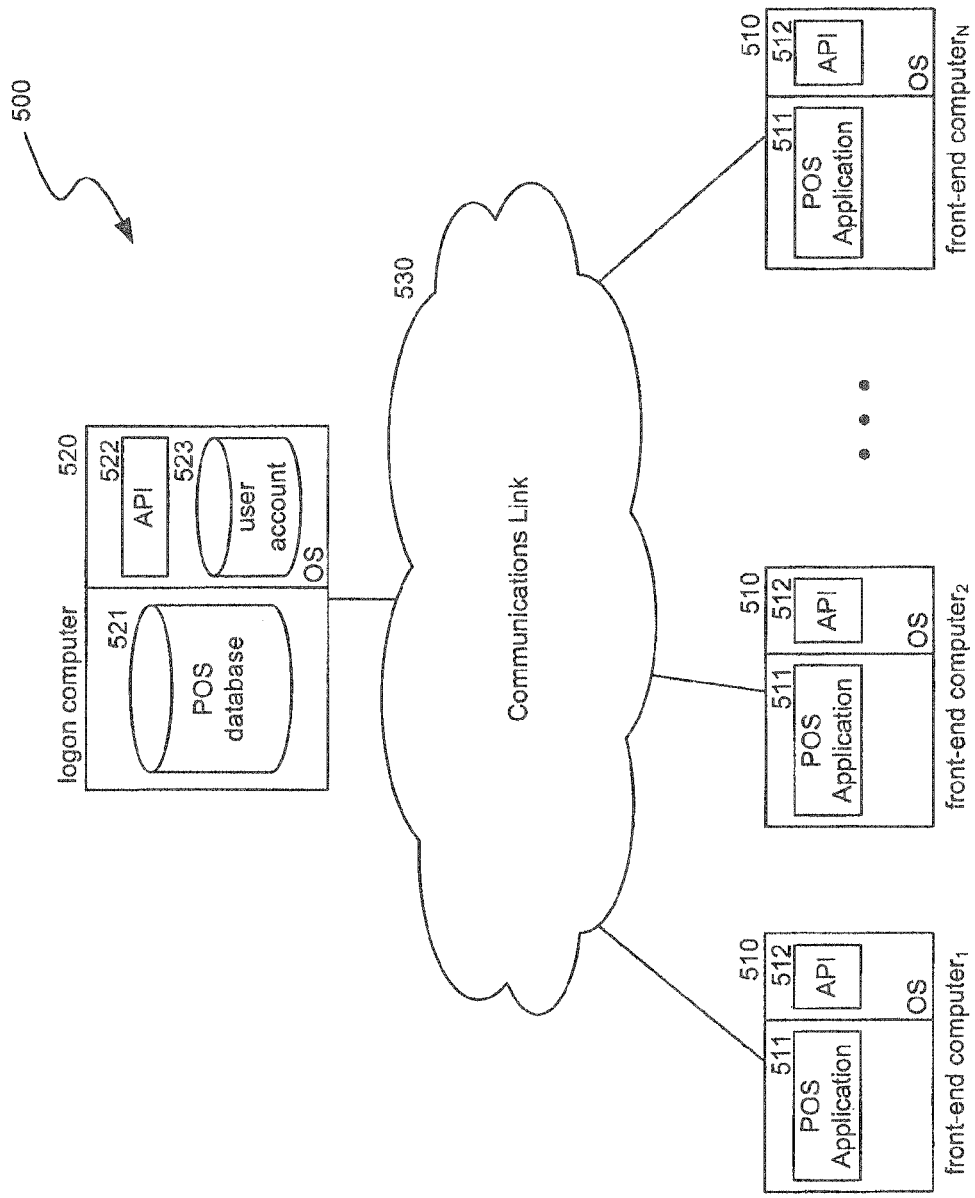
FIG. 5 is a block diagram illustrating various components of the authentication system used to authenticate users and authorize access requests made by users of a point of sale ("POS") application program executing at a front-end computer in some embodiments.

FIG. 5 is a block diagram illustrating various components of the authentication system used to authenticate users and authorize access requests made by users of a point of sale ("POS") application program executing at a front-end computer in some embodiments. An instance of the POS application program 511 is stored at each of several front-end computers 510. The POS application program provides a user interface for conducting various POS transactions involving POS database 521. Each front-end computer also includes API 512 for interacting with the operating system executing at the front-end computer. Logon computer 520 includes POS database 521, API 522 for interacting with the operating system executing at the logon computer, and user account store 523. User account store 523 is similar to user account store 123 discussed above with respect to FIG. 1. In this embodiment, each user account is granted, at minimum, rights to open a connection to the POS database, access to which is managed by the operating system executing at the logon computer. When a user needs to be authenticated, the application program prompts the user at the front-end computer to enter credentials. The application program sends the credentials to the logon computer, via communications link 530, where the operating system generates a token using the received credentials. The token is then transferred to the front-end computer so that requests to access POS database 521 can be made using the token. As discussed in detail below, because the operating system executing at the logon computer manages access to POS database 521, the POS application program can use the security features of the operating system to authenticate users and authorize user requests to access POS database 521.

Figure 6:
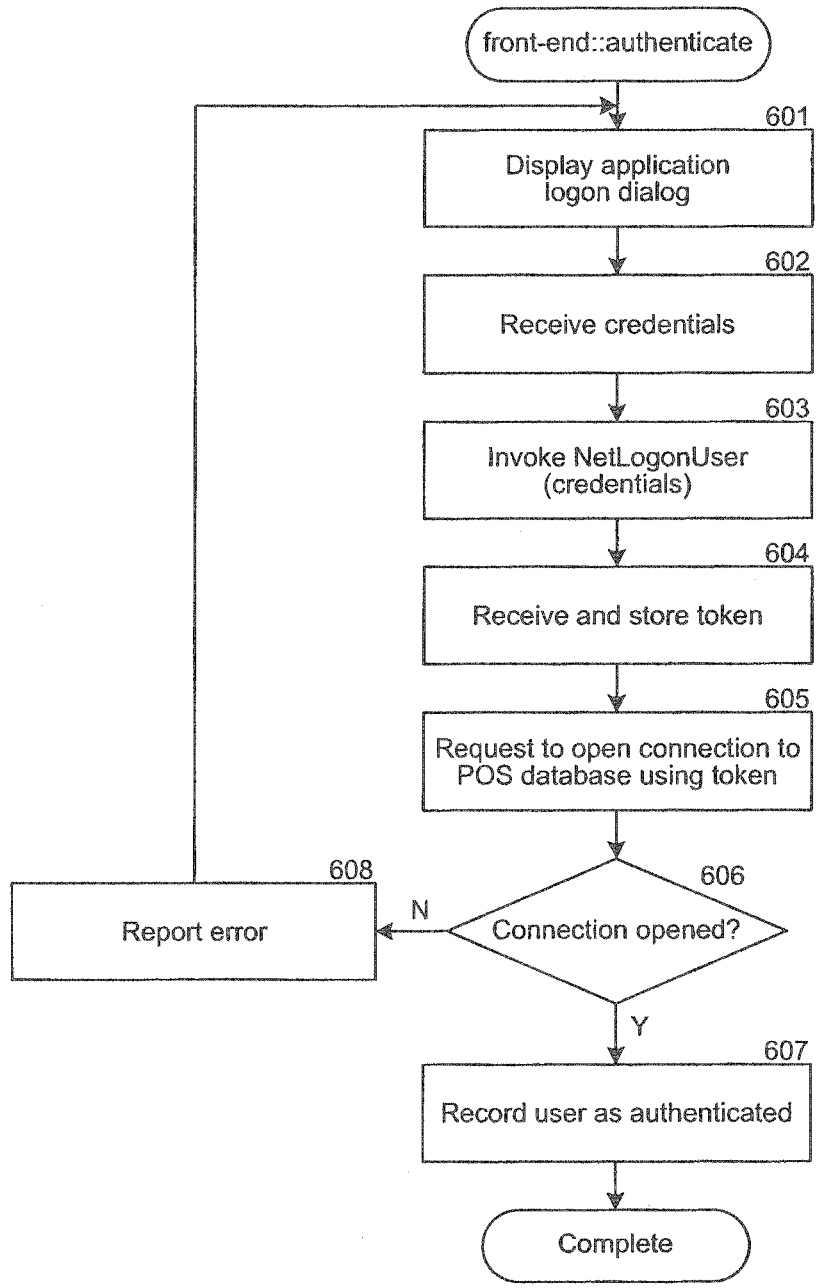
FIG. 6 is a flow diagram that illustrates the processing of the authenticate component of a front-end computer in some embodiments.

FIG. 6 is a flow diagram that illustrates the processing of the authenticate component of a front-end computer in some embodiments. The component attempts to authenticate an application program user at a front-end computer by attempting to open a connection to the POS database. In block 601, the component displays a dialog prompting the user to provide logon credentials, such as a username and password. In block 602, the component receives the credentials from the user. In block 603, the component invokes a function of the API at the front-end computer, for example the NetLogonUser API of the Windows operating system. The function passes the received credentials to the logon computer where the operating system executing at the logon computer generates a token using the username and password and transfers the token to the front-end computer. In block 604, the front-end computer receives and stores the token. In block 605, the component attempts to open a connection to the POS database using the token. If the operating system executing at the logon computer determines that the user account associated with the token has permission to open a connection to the POS database, then a connection is opened, thus validating the token and authenticating the user. In decision block 606, if a connection was not opened, then the component transitions to block 608 where an error is reported and then loops back to block 601 so that the user can re-enter credentials, else the component continues to block 607, where the user is recorded as authenticated. The processing of the component then completes.

FIG. 7 is a flow diagram illustrating the processing of the access POS database component of a front-end computer in some embodiments. The component is invoked in response to a user performing an operation requiring access to the POS database after the user has been authenticated in the manner described above. In block 701, the component attempts to access the POS database by invoking an access component of the logon computer using the stored token. In decision block 702, if the operating system executing at the logon computer authorizes access to the POS database, then the accessed data is returned, else the component continues to block 703. In block 703, the component reports an error and then returns an indication of the error.

FIG. 8 is a flow diagram illustrating the processing of the access component of a logon computer in some embodiments. The component is invoked when the logon computer receives a request to access a resource managed by the operating system executing at the logon computer. In block 801, the component attempts to access the resource, in this example POS database, in the manner requested using the received token. The operating system executing at the logon computer, which manages access to the POS database, determines whether the user has permission to access the POS database in the manner requested. Because the operating system executing at the logon computer manages access to POS database, the authentication system can take advantage of the built-in security features of the operating system. In decision block 802, if the operating system indicates that the user account associated with the received token is authorized to access the POS database in the manner requested, then the POS database is accessed and the accessed data is returned along with an indication of the success, else the component returns an indication of the failed attempt.

Figure 9:
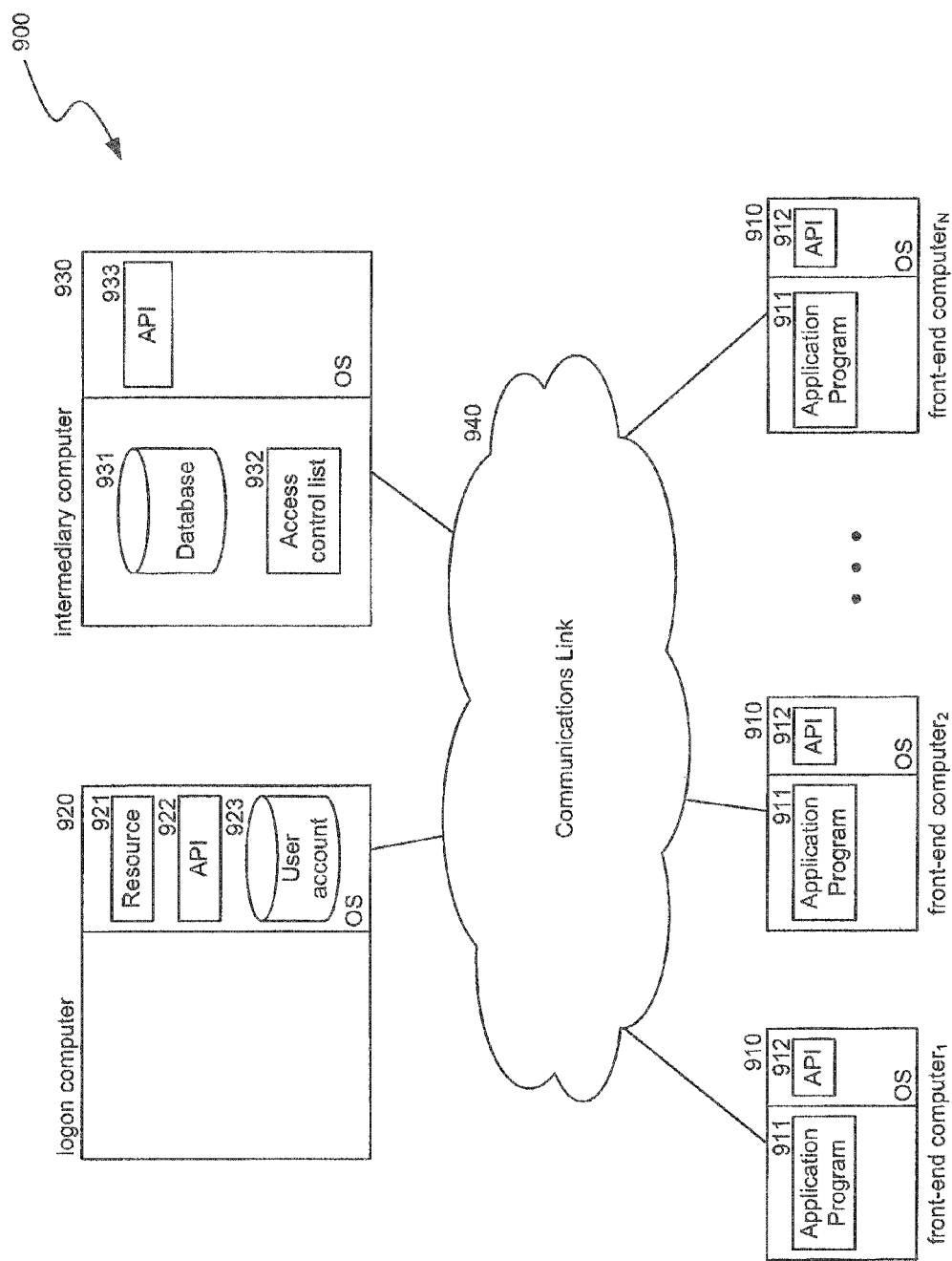
FIG. 9 is a block diagram illustrating various components of the authentication system used by an intermediary computer to authenticate a user of a database application program executing at a front-end computer in some embodiments.

FIG. 9 is a block diagram illustrating various components of the authentication system used by an intermediary computer to authenticate a user of a database application program executing at a front-end computer in some embodiments. An instance of the application program 911 is stored at each of several front-end computers 910. Application program 911 provides an interface to the data stored in database 931. Each front-end computer also includes an API for interacting with the operating system of the front-end computer. The intermediary computer stores database 931, access control list 932, and API 933. Access control list 932 stores an indication of each user and each user's rights to access database 931. Logon computer 920 includes resource 921, API 922, and user account store 923. User account store is similar to user account store 123 discussed above with respect to FIG. 1. In this embodiment, the authentication system authenticates users at front-end computers attempting to access database 931. The intermediary computer receives user credentials from a user via a front-end computer and forwards these credentials to the logon computer to generate a token. The intermediary computer then requests access to resource 921 managed by the operating system executing at the logon computer in order to validate the token and authenticate the user. Once the user has been authenticated, database 931 uses access control list 932 to authorize user requests to access data. The logon computer, intermediary computer, and front-end computers may be connected via communications link 940.

Figure 10:
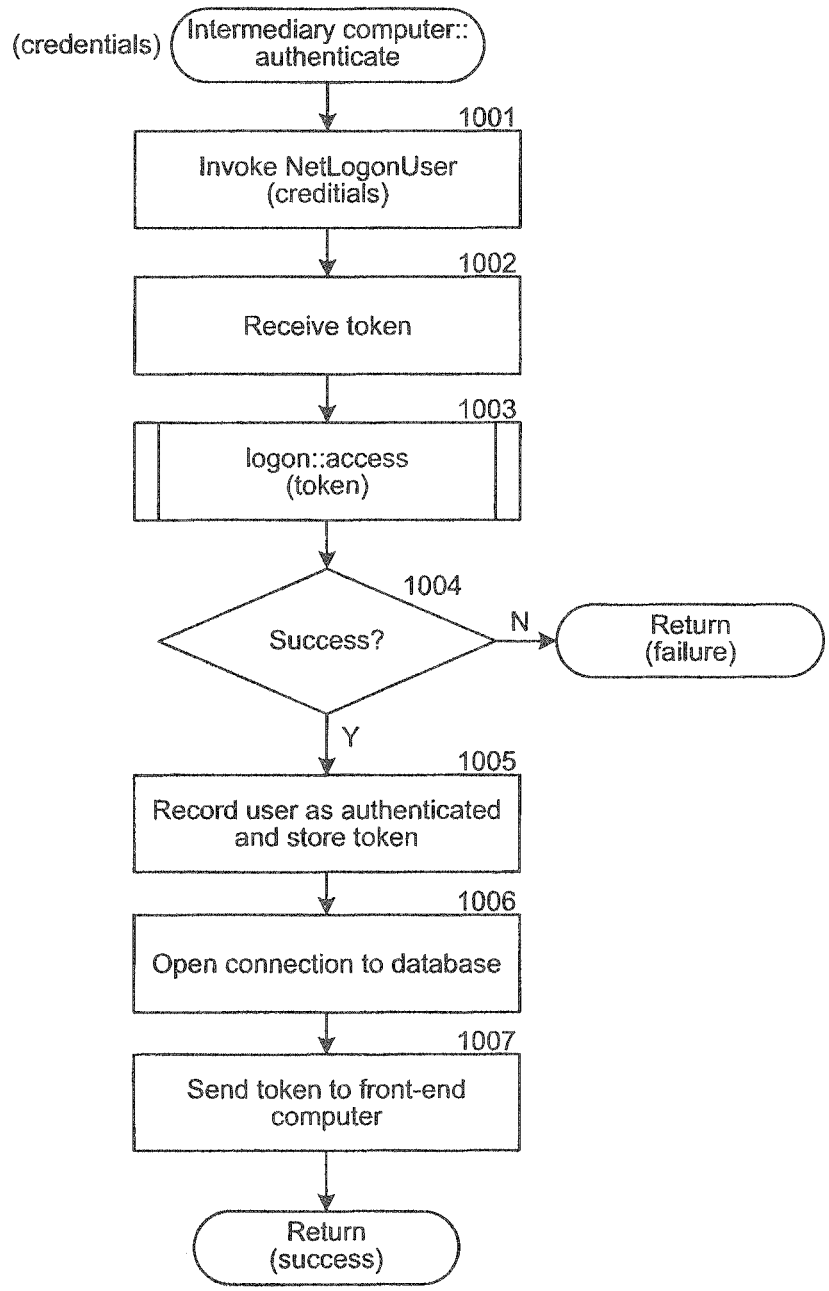
FIG. 10 is a flow diagram illustrating the processing of the authenticate component of an intermediary computer in some embodiments.

FIG. 10 is a flow diagram illustrating the processing of the authenticate component of an intermediary computer in some embodiments. This diagram illustrates the process of authenticating a user at a logon computer for access to resources managed by an intermediary computer. The intermediary computer facilitates the authentication process between the logon computer and the front-end computer. The component is invoked when a user from the front-end computer attempts to access a resource at the intermediary computer, in this example a database. The front-end computer invokes the authentication component of the intermediary computer and passes the user's credentials to the component. In block 1001, the authentication component invokes a function of the API at the intermediary computer, for example the NetLogonUser API of the Windows operating system. The NetLogonUser method passes the received credentials to the logon computer where the operating system executing at the logon computer generates a token using the credentials. In block 1002, the component receives the token from the logon computer. In block 1003, the component attempts to access a resource managed by the logon computer using this token. The operating system executing at the logon computer processes the access request using the operating system's built-in security features to check if the user is authorized to access that resource. If the user account associated with the token is authorized to access the resource in the manner requested, request is granted. When the request is granted, the authentication component at the intermediary computer assumes the token to be valid and the user to be authenticated. In decision block 1004, if the access to the resource is unsuccessful, the component returns an indication of the failure, otherwise the component continues to block 1005. In block 1005, the user is recorded as authenticated and the intermediary computer stores the token. In block 1006, the component opens a connection to the database. In block 1007, the component sends the token to the front-end computer so that requests from the user to access the database can be made using the token. The component then returns an indication of the success.

Figure 11:
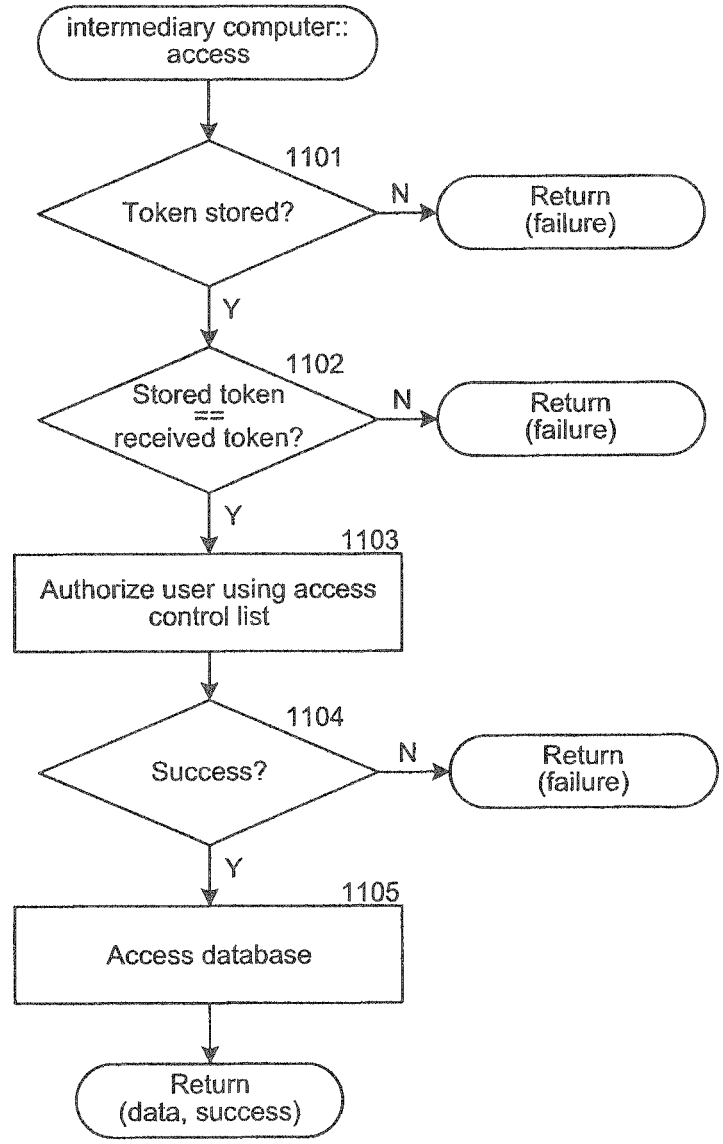
FIG. 11 is a flow diagram illustrating the processing of the access component of the intermediary computer in some embodiments.

FIG. 11 is a flow diagram illustrating the processing of the access component of the intermediary computer in some embodiments. The access component is invoked when a user attempts to access the database at the intermediary computer. In decision block 1101, if a token is not already stored for the user attempting to access the database, the intermediary computer cannot authenticate the user using the token and the component returns an indication of the failure, else the component continues to decision block 1102. In decision block 1102, if the token stored for the user is not identical to the token received from the user, then the intermediary computer cannot authenticate the user using the token and the component returns an indication of the failure, else the component continues to block 1103. In block 1103, the component checks the access control list to determine whether the user has permission to access the database in the manner requested. In decision block 1104, if the access control list indicates that the user does not have permission to access the resource in the manner requested, then the component returns an indication of the failure, else the component continues to block 1105. In block 1105, the component accesses the database. The component then returns the accessed data and an indication of the success.

Although the subject matter has been described in language specific to structural features and/or methodological acts, it is to be understood that the subject matter defined in the appended claims is not necessarily limited to the specific features or acts described above. For example, in some embodiments a single computer may perform roles of both the front-end computer and the logon computer. As another example, the authentication system may use the security features built into an operating system executing at a logon computer to control access to other devices, such as a peripheral attached to the logon computer, a security gate, a vault, and so on. Furthermore, the authentication system can authenticate users of multiple application programs or multiple features of application programs by associating a different resource managed by the operating system executing at a logon computer to each application program or application program feature. The specific features and acts described above are disclosed as example forms of implementing the claims. Accordingly, the invention is not limited except as by the appended claims.

We claim:

1. A method, performed by a first computing system having a processor, for authenticating a user of a first application executing at a second computing system, the method comprising:
    establishing a user account with an operating system executing at the first computing system and configured to manage access to a first resource;
    receiving, from the second computing system, a request to authenticate a user, the request including credentials;
    requesting access to the first resource using the established user account and the received credentials; and
    sending, to the second computing system, an indication of whether the first resource was successfully accessed using the established account and the received credentials,
    wherein authentication of the user is based at least in part on whether the resource was successfully accessed at the first computing system using the established account and the received credentials.

2. The method of claim 1, further comprising:
    associating each of a plurality of applications executing at the second computing system with a unique resource at the first computing system so that each of the plurality of applications executing at the second computing system is associated with a different resource.

3. The method of claim 2, wherein the operating system executing at the first computing system is further configured to manage access to each of the unique resources.

4. The method of claim 1, further comprising:
    responsive to determining that the resource was not successfully accessed, indicating, by the first application, that the user has not been authenticated to use the first application.

5. The method of claim 1, further comprising:
    associating each of a plurality of features of a second application executing at the second computing system with a unique resource at the first computing system, so that each of the plurality of features of the second application executing at the second computing system is associated with a different resource at the first computing system.

6. The method of claim 1, wherein the first resource is a file and the requested access to the first resource is a request to write to the file, so that authentication of the user is based at least in part on whether the file was successfully written to using the established account and the received credentials.

7. The method of claim 1, wherein the second computing system is a mobile device so that the request to authenticate the user is received from the mobile device.

8. A first computing system for authenticating a user of an application, the first computing system comprising:
    a component configured to receive credentials for accessing a user account of an operating system executing at a remote computing system configured to manage access to a first resource;
    a component configured to transmit to the remote computing system a request to access the first resource using the received credentials for accessing the user account of the operating system executing at the remote computing system,
        wherein the request is transmitted before the user has been authenticated by the application; and
    a component configured to receive from the remote computing system, an indication of whether the first resource was successfully accessed using the received credentials for accessing the user account of the operating system executing at the remote computing system,
    wherein the application is configured to authenticate the user responsive to determining that the resource was successfully accessed using the received credentials for accessing the user account of the operating system executing at the remote computing system.

9. The first computing system of claim 8, wherein the first computing system is a mobile device.

10. The first computing system of claim 9, further comprising:
    a component configured to associate each of a plurality of applications executing at the first computing system with a unique resource at the remote computing system.

11. The first computing system of claim 10, further comprising:
    a component configured to, responsive to a request to access one of the plurality of applications executing at the first computing system,
        identify the unique resource associated with the application, and
        transmit to the remote computing system a request to access the identified resource.

12. The first computing system of claim 9, further comprising:
    a component configured to, for each of a plurality of features of the application, associate, with the feature, a unique resource at the remote computing system, so that each feature of the application is associated with a different resource at the remote computing system.

13. The first computing system of claim 12, further comprising:
    a component configured to, responsive to receiving a request to access a first feature of the application,
        identify the resource associated with the first feature of the application.

14. The first computing system of claim 13, further comprising:
    a component configured to send to the remote computing system a request to access the identified resource associated with the first feature of the application.

15. A computer-readable memory storing instructions that, if executing by a first computing system having a processor, cause the first computing system to perform a method for authenticating users of a second computing system, the method comprising:

establishing, by the first computing system, user accounts with an operating system executing at the first computing system and configured to manage access to a first resource and a second resource;

responsive to receiving, from the second computing system, a first request to authenticate a user on behalf of a first application executing at the second computing system, the first request including credentials, requesting, by the first computing system, access to the first resource using the established user account and the credentials of the first request, and sending, to the second computing system, an indication of whether the first resource was successfully accessed using the established account and the credentials of the first request; and responsive to receiving, from the second computing system, a second request to authenticate the user on behalf of a second application executing at the second computing system, the second request including credentials, requesting, by the first computing system, access to the second resource using the established user account and the credentials of the second request, sending, to the second computing system, an indication of whether the second resource was successfully accessed using the established account and the credentials of the second request.

16. The computer-readable memory of claim 15, wherein the first resource is a database and the requested access to the first resource is a request to open a connection to the database and wherein the first application executing at the second computing system is configured to authenticate users responsive to determining that the connection to the database was successfully opened.

17. The computer-readable memory of claim 15, wherein the second resource is a file and the requested access to the second resource is a request to read the file and wherein the second application executing at the second computing system is configured to authenticate users responsive to determining that the file was successfully read.

18. The computer-readable memory of claim 15, the method further comprising:

responsive to determining that the first resource was not successfully accessed, providing an indication that the user has not been authenticated to use the first application.

19. The computer-readable memory of claim 18, the method further comprising:

responsive to determining that the second resource was successfully accessed, providing an indication that the user is authenticated to use the second application.

20. The computer-readable memory of claim 15, wherein the second computing system is a mobile device.

* * * * *